(12) United States Patent
Schaefer et al.

(10) Patent No.: US 6,659,360 B1
(45) Date of Patent: Dec. 9, 2003

(54) METHOD AND SYSTEM FOR A TWO-SECOND KEY HOLD CONVENTION FOR CLIMATE CONTROL

(75) Inventors: Eric Gerd Schaefer, Farmington Hills, MI (US); Leighton Ira Davis, Jr., Ann Arbor, MI (US); Gerhard A. Dage, Franklin, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/065,855

(22) Filed: Nov. 26, 2002

(51) Int. Cl.[7] .................................................. G05D 23/00
(52) U.S. Cl. ........................ 236/51; 236/94; 236/46 R; 62/157
(58) Field of Search .................... 236/51, 94, 46 C, 236/46 R; 62/157, 158, 209

(56) References Cited

U.S. PATENT DOCUMENTS

| | | | |
|---|---|---|---|
| 4,724,680 A | * | 2/1988 | Kawai ........................ 62/115 |
| 4,794,537 A | | 12/1988 | Adasek et al. |
| 5,027,611 A | * | 7/1991 | Doi et al. ....................... 62/158 |
| 5,228,305 A | * | 7/1993 | Vogt ............................ 62/133 |
| 5,486,809 A | | 1/1996 | Wadlington, Jr. |
| 5,511,724 A | | 4/1996 | Freiberger et al. |
| 5,518,065 A | | 5/1996 | Asou et al. |
| 5,554,912 A | | 9/1996 | Thayer et al. |
| 5,579,994 A | | 12/1996 | Davis, Jr. et al. |
| 5,712,625 A | | 1/1998 | Murphy |
| 5,734,971 A | | 3/1998 | Thayer et al. |
| 5,937,940 A | | 8/1999 | Davis, Jr. et al. |
| 2001/0045009 A1 | | 11/2001 | Ohga et al. |

* cited by examiner

Primary Examiner—Marc Norman
(74) Attorney, Agent, or Firm—Brooks & Kushman; Raymond L. Coppiellie (57) ABSTRACT

A method for adapting a vehicle climate control system to a user comfort preference includes performing an adjustment strategy in response to assertion of at least one user-generated signal at less than a predetermined level and during less than a predetermined time interval and performing at least one adaptive strategy in response to assertion of the user-generated signal at greater than the predetermined level during the predetermined time interval.

20 Claims, 6 Drawing Sheets

METHOD AND SYSTEM FOR A TWO-SECOND KEY HOLD CONVENTION FOR CLIMATE CONTROL

BACKGROUND OF INVENTION

1. Field of the Invention

The present invention relates to climate control systems generally and, more particularly, to a two-second key hold convention for a climate control system.

2. Background Art

A fundamental goal of vehicle climate control or heating, ventilating, and air conditioning (HVAC) systems is to provide thermal comfort to vehicle occupants. To achieve this goal, a control system that establishes vehicle cabin (i.e., passenger compartment) conditions takes into account the relationship between comfort and the variables that affect comfort. Human thermal comfort is a complex reaction, involving physical, biological, and psychological responses to the given conditions.

Furthermore, individual users can vary in their perception of vehicle climate comfort. The individual perception can be based on such factors (or parameters) as the user metabolic rate, acclimation (i.e., a person from a hot climate visiting a cold climate and vice versa), amount and type of clothing worn, sun load on the interior of the vehicle, temperature and relative humidity inside and outside of the vehicle, etc. Because of this complexity, a HVAC control system (or system controller) implements strategies that process many variables and possible interactions. It is often desirable to adapt a control strategy to a driver's and passenger's preferences as well as to the detection of special conditions thereby changing the response of the HVAC system.

A number of conventional vehicle climate control systems have been implemented that provide a controller for a user (e.g., the vehicle driver and passengers) to set a target temperature value and a target system blower motor speed. The temperature value is typically displayed on a digital readout or analog scale indicator. The blower motor speed may be indicated as well. In a typical climate control system, the user and the climate control system controller can also adjust a number of vent openings, deflectors, diverters, sun shades, etc., via electrical and vacuum actuators and mechanical switching to affect perceived thermal comfort.

In view of the foregoing, a method and system is needed for providing a climate control strategy that adapts to accommodate the individual preference of comfort such that fewer adjustments are performed when similar climate conditions are encountered. The improved climate control strategy should allow users to indicate their preferences, both explicitly and inferentially. The improved climate control strategy should establish user climate control preferences via interpretation of existing climate control interfaces (e.g., temperature controls, blower motor speed controls, etc.).

SUMMARY OF THE INVENTION

One aspect of the present invention is to provide a method for adapting a vehicle climate control system to a user comfort preference comprising performing an adjustment strategy in response to assertion of at least one user-generated signal at less than a predetermined level and during less than a predetermined time interval and performing at least one adaptive strategy in response to assertion of the user-generated signal at greater than the predetermined level during the predetermined time interval.

According to another aspect of the invention, a vehicle climate control system adaptable to a user climate comfort preference is provided comprising a plurality of user interfaces and a controller for performing an adjustment strategy when a user adjusts at least one of the interfaces by less than a predetermined amount and during less than a predetermined time interval and for performing at least one adaptive strategy when the user adjusts the interface by greater than a predetermined amount during the predetermined time.

According to yet another aspect of the invention, for use in a vehicle climate control system, a method for adapting to a user climate comfort preference is provided comprising providing a controller for performing an adjustment strategy when a user adjusts at least one interface by less than a predetermined level and during less than a predetermined time interval and for performing at least one adaptive strategy when the user adjusts the interface by greater than the predetermined level during the predetermined interval.

The foregoing and other features of the invention are more fully described in the following description that describes certain illustrative embodiments of the invention. These illustrative embodiments are merely indicative of but a few of the various ways in which the principles of the present invention may be employed. Accordingly, specific structural and functional details of the illustrative embodiments are not interpreted as limiting, but merely as representative to teach one skilled in the art how to employ the present invention.

DETAILED DESCRIPTION

The present invention generally provides an improved climate control strategy method and system that changes (or adapts) to accommodate the individual user preferences for improved comfort and convenience. The present invention may provide a climate control method and system whereby users may indicate preferences explicitly or inferentially. The invention may implement at least one adaptive preference strategy such that the user climate control comfort preference is improved and fewer or no adjustments are performed when similar climate conditions are encountered again. The climate control strategy method and system of the present invention may be implemented in connection with existing (or familiar to the user) interfaces.

When a user climate control preference strategy is adapted (or altered), the present invention generally notifies the user (i.e., acknowledges that the user has indicated a desire to change the preference). In at least one example (e.g., a general reset of adaptive parameters), the method and system of the present invention may request user confirmation of the preference change.

The present invention generally implements at least one minor adjustment routine (e.g., process, operation, steps, etc.). The minor adjustment routine is generally implemented in response to a minor change (or adjustment) of a climate control interface (i.e., an adjustment of less than a predetermined level). The minor adjustment routine generally comprises changing (i.e., adjusting) the respective climate control operation in response to the minor change (or adjustment) to the climate control interface to the level indicated by the minor change without altering a climate control user preference strategy. In one example, at least one of the minor adjustment strategies may adjust the respective climate control operation and update the respective display (e.g., the display of the set temperature, blower motor speed, etc.). In another example, at least one of the minor adjustment strategies may adjust the respective climate control operation and leave the respective display at the previous indication (e.g., when a minor adjustment to the climate control interface does not relate to a displayed incremental change).

The minor adjustment strategy (or routine) of the present invention may be configured such that a relatively small adjustment to at least one interface control (e.g., a single hit to a temperature increase/decrease button, a single increment change of a rotary or slide temperature switch. setting, a single increment change of a blower motor speed setting, etc.) changes (or adjusts) in a relatively brief time (i.e., less than a predetermined time) the respective climate control function without altering at least one adaptive preference strategy that may be implemented according to the present invention (i.e., the adjustment strategy and the adaptive strategy are generally independent).

The adaptive strategy (or routine) may accommodate a number of climate control user thermal comfort preference dimensions (i.e., factors, parameters, etc.). At least one of the climate control dimensions may be global (i.e., generally adaptive along an adaptive dimension beyond an immediate region of dependence on another climate control dimension). Similarly, least one of the climate control dimensions may be local (i.e., generally adaptive along an adaptive dimension in an immediate region of dependence on another climate control dimension). The thermal comfort factors (or dimensions) may be implemented as at least one rule set (i.e., a group of the respective thermal comfort factors).

In one example, a relatively small adjustment to at least one interface control within a relatively short time interval may provide an inferential indication of a relatively small to medium general preference direction for the user. The present invention may be configured to change (i.e., adapt) the climate control strategy according to at least one factor (or parameter) that may comprise a previous climate control strategy, current climate factors (e.g., relative humidity, sun load, external temperature, internal temperature, etc.), the control interface that was adjusted (e.g., temperature increase, temperature decrease, blower motor speed increase, blower motor speed decrease, etc.), the amount (i.e., absolute level, percentage, etc.) of adjustment, and time interval between adjustments.

In another example, a relatively large adjustment (e.g., greater than the predetermined level) to at least one interface control within a relatively short time interval (e.g., more than the predetermined time interval) may provide an inferential indication of a relatively large (or intense) general preference direction for the user. Similarly, a relatively large adjustment to at least one interface control within a relatively longer time interval (e.g., another predetermined time interval, longer than the first predetermined interval) may provide an inferential indication of another (e.g., less intense) general climate control comfort preference direction for the user. The present invention may further be configured to provide other inferential adaptations to the climate control strategy according to the other adjustments to the interface controls (e.g., adjustments to multiple controls, etc.) within the relatively short or longer time intervals.

Figure 1:
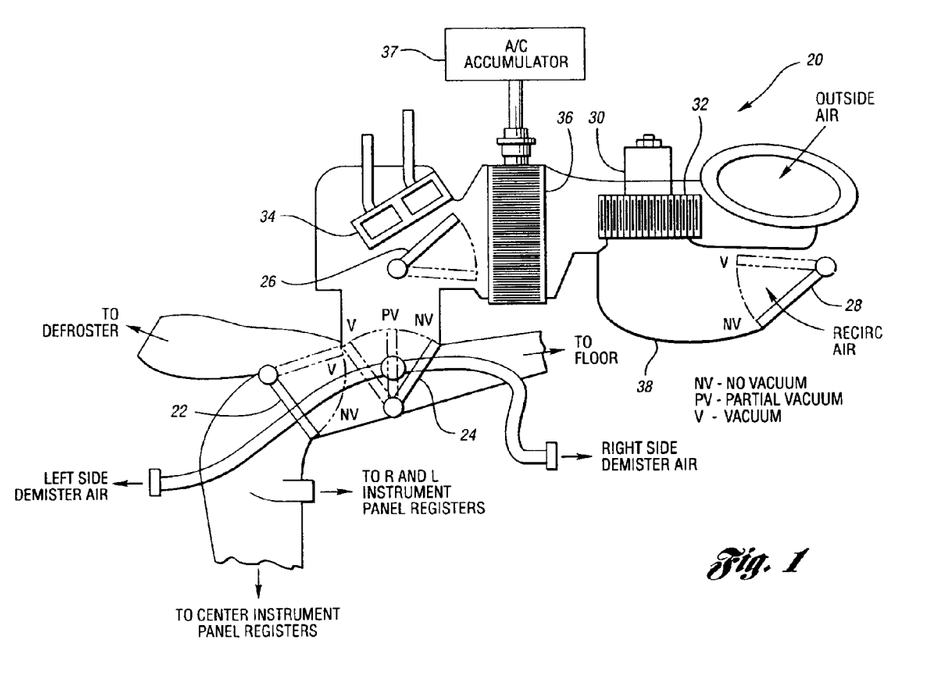
FIG. 1 is a diagram of a vehicle climate control system according to the present invention.

Referring now to FIG. 1, a heating, ventilating, and air conditioning (HVAC) or climate control system 20 in accordance with the present invention is shown. The climate control system 20 is generally implemented in connection with a vehicle (e.g., automobile, truck, sport utility vehicle, etc.). However, the climate control system 20 of the present invention may be advantageously implemented in any appropriate climate control environment to meet the design criteria of a particular application.

In general, control of temperature and air flow (and to a lesser extent, humidity) within a vehicle is accomplished using various actuators to affect the temperature and flow of air supplied to the cabin (i.e., passenger compartment) of the vehicle. The system 20 generally comprises the arrangement of panel-defrost, floor-panel, temperature blend and outside recirculated air actuators or doors 22, 24, 26 and 28, respectively. The doors 22 and 24 are generally driven by vacuum motors (not shown) between respective various vacuum, partial vacuum and no vacuum positions in a conventional fashion as indicated in FIG. 1. The door 26 is generally driven by an electric servo motor also in a conventional fashion. The door 28 may also be driven by an electric servo motor so that the position of the door 28 is continuously variable. The system 20 further comprises a variable speed blower motor 30 including a blower wheel 32 and a control element (e.g., A/C clutch, thermal expansion valve, etc.) 45 (shown in FIG. 2).

The system 20 further comprises heating and cooling elements such as a heater core 34 and an evaporator core 36 fed by an A/C accumulator 37 of a typical vehicle air conditioning plant. Each of the above components is generally connected via ducts 38 in order to control temperature, the direction of air flow and the ratio of fresh air to recirculated air to control humidity within the vehicle passenger compartment.

For automatic control of the humidity, temperature and flow of air in the cabin, conditions within and outside the cabin are generally monitored by sensors. An electronic controller may generate signals to control the system 20 actuators according to the conditions as indicated by the sensors. For example, the evaporator core 36 temperature is generally controlled to allow the system 20 to dehumidify air moving thereover.

Figure 2:
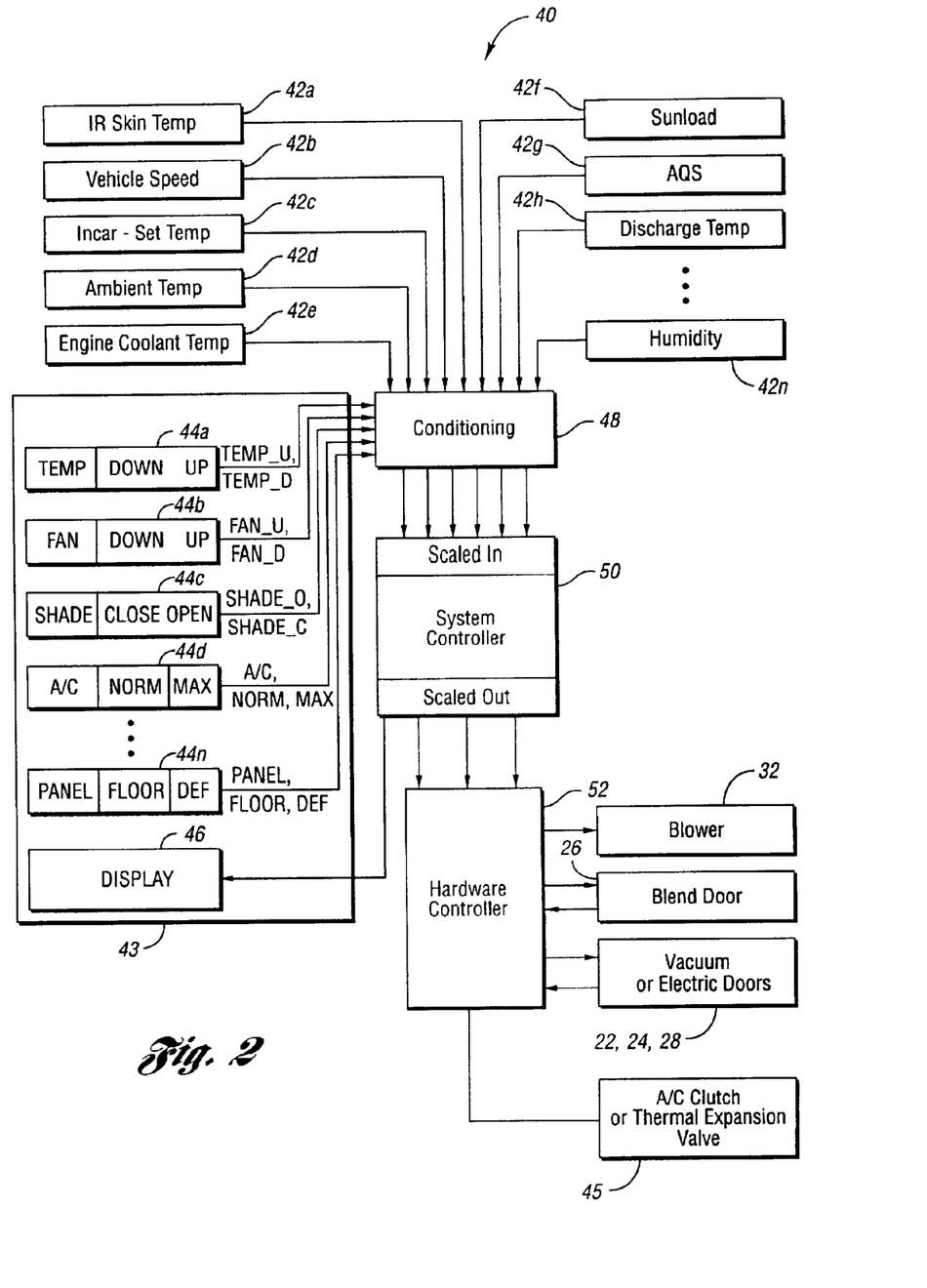
FIG. 2 is a diagram of vehicle climate control sensors and a controller according to the present invention.

Referring to FIG. 2, a diagram 40 illustrating sensors, a user interface, and a controller that are generally implemented in connection with the system 20 is shown.

The system 20 comprises a complement of sensors 42 (e.g., 42a–42n) that generally present output signals which are representative of (e.g., correspond to, relate to, etc.) infrared (IR) skin temperature 42a, vehicle speed 42b, in-car temperature 42c, ambient (e.g., outside, external, etc.) air temperature 42d, engine coolant temperature (ECT) 42e, sun load 42f, air quality (AQS) 42g, discharge duct 38 air temperature 42h, and humidity 42n.

A user interface 43 generally comprises at least one (generally a plurality) of climate control interfaces or switches 44 (e.g., switches 44a–44n) that generally present at least one control signal and a display 46. A single hit, push, actuation, etc. of at least one switch 44 generally corresponds to an incremental assertion of a respective signal. In one example, a temperature adjustment switch 44a generally presents a signal (e.g., TEMP_U) that may correspond to a user actuation of an "up" key (or button) indicating a desire to set or increase the vehicle in-car temperature 42c and a signal (e.g., TEMP_D) that may correspond to a user actuation of a "down" key (or button) indicating a desire to set or decrease the vehicle in-car temperature 42c.

In another example, a blower motor speed adjustment switch 44b generally presents a signal (e.g., FAN_U) that may correspond to a user actuation of an "up" key indicating a user desire to set or increase blower motor 30 fan speed and a signal (e.g., FAN_D) that may correspond to a user actuation of a "down" key indicating a user desire to set or decrease blower motor 30 fan speed.

In another example, a sun shade open and close movement may be controlled via actuation of at least one key on the switch 44c and respective control signals (e.g., SHADE_O and SHADE_C). A switch 44d may have at least one key (or button) that may be actuated (or pushed) and may assert at least one signal (e.g., A/C, NORM, or MAX) that may control air conditioning via the signal A/C and cabin air circulation via the signals NORM (e.g., normal or fresh air circulation), or MAX (e.g., recirculation). A switch 44n may have at least one key (or button) that may be actuated (or pushed) and may assert at least one signal (e.g., PANEL, FLOOR, or DEF) that may control cabin air circulation via the signals PANEL (e.g., instrument panel air flow), FLOOR (e.g., floor duct air flow), or DEF (e.g., windshield defrost air flow).

While the switches 44 have been described having bi-directional keys (or buttons), any appropriate incremental switch mechanism (not shown, e.g., rotary switch, thumb-wheel switch, slide switch, etc.) may be implemented to meet the design criteria of a particular application. Furthermore, in a vehicle having multi-zone climate control (not shown, e.g., separate user climate control for zones such as driver and passenger, front and rear, etc.) a number of the sensors 42 and switches 44 and the respective signals may be provided for each of the zones in the vehicle.

The display 46 may be implemented as a digital display, a bar graph display, or any other appropriate display to meet the design criteria of a particular application. Alternatively, for example in the cases of rotary or slide switches 44, a relative position of the switch 44 may be implemented as the visual display 46.

The system 20 generally comprises at least one set signal or set point value that may indicate climate control conditions (or parameters) that are desired by the user and that are generally displayed via the display 46. A temperature value may indicate a desired cabin (or zone) temperature that is generally selectable (and displayed) as either degrees Fahrenheit (F) or degrees Celsius (C). A set signal or set point blower motor 30 speed value may indicate a desired blower motor 30 speed. Another set value may correspond to at least one other desired set point (e.g., at least one sun shade setting). The set point values are generally initially set (or chosen) manually by the user via the switches 44 and the respective signals that are generally displayed to the user via the display 46 or the respective switch 44 position.

The set point value displayed via the display 46 generally corresponds to information (e.g., cabin temperature, blower fan speed, etc.) that relates to at least one thermal comfort adaptive strategy (described below in connection with FIGS. 3–6). The set point value may be displayed as a measure of the user current thermal offset relative to the nominal value when the system 20 calibration has been performed to reflect thermal comfort for an average person. A one degree setting change in display may correspond to approximately 1.5 degrees F (or 0.8 degrees C) of actual change. The at least one thermal comfort strategy generally calculates (or generates) a target temperature offset that corresponds to the in-car-set temperature signal minus 75 degrees F (or minus 24 degrees C).

The displayed set point value generally represents the current set point for the respective thermal comfort strategy. Temporary offsets to the preference set are generally implemented via single key actuation (i.e., single increment) adjustments.

Figure 3:
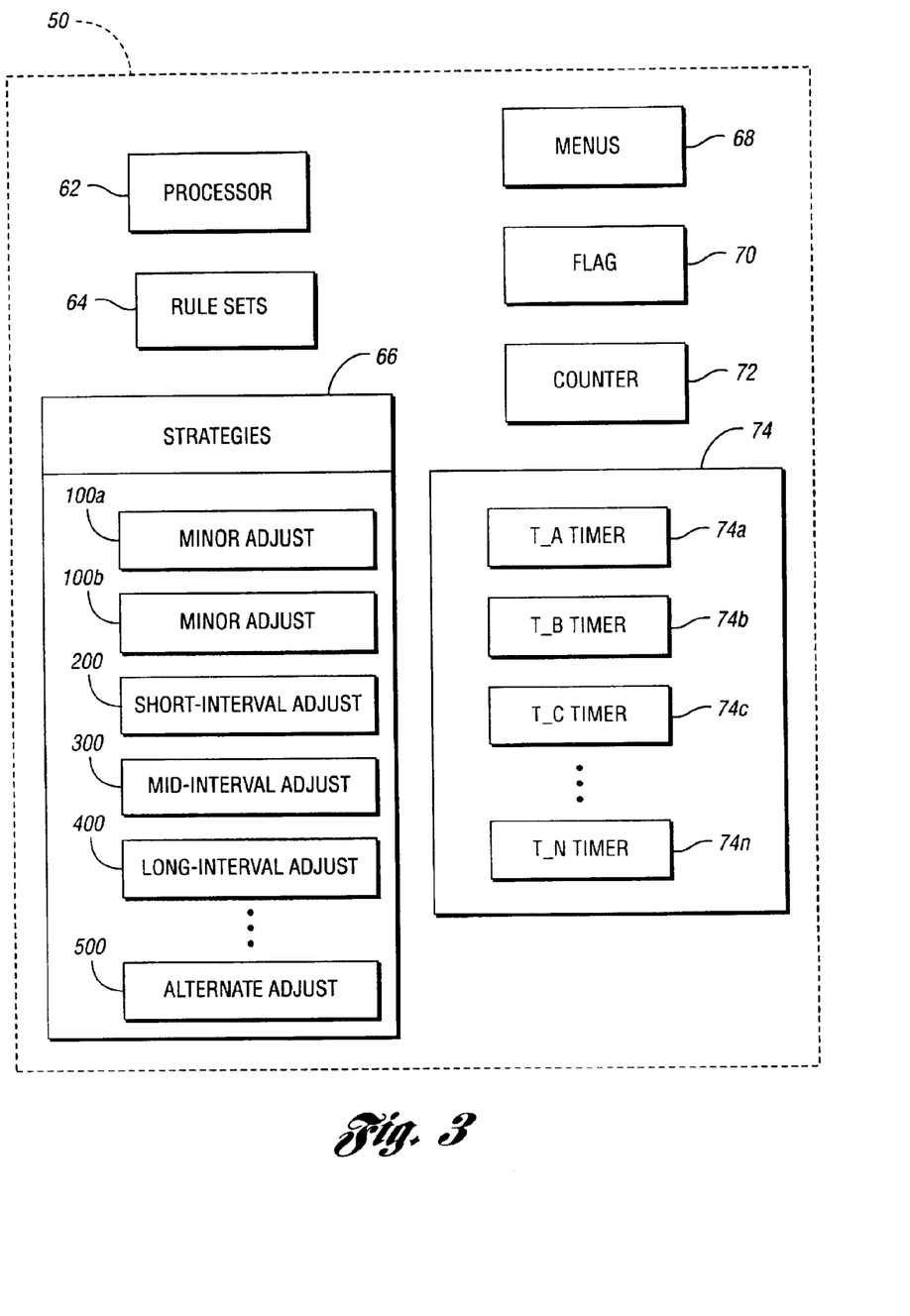
FIG. 3 is a detailed diagram of the controller of FIG. 2.

The interface 43 may further be configured to provide the user access to at least one menu (or selection structure) in a system controller 50. The user may interface with the at least one menu via the switches 44. Information corresponding to the menus may be displayed to the user via the display 46.

The sensor 42 output signals and the control input signals TEMP_U, TEMP_D, FAN_U, FAN_D, etc. may be presented to the system controller 50 as inputs after being conditioned by a conditioning circuit (or interface) 48. The controller 50 generally scales the input signals, performs at least one process (e.g., routine, steps, procedure, etc.) in connection with at least one climate control routine or strategy (described in connection with FIGS. 3–6), and presents respective scaled output signals to the display 46 and a hardware controller (or interface) 52. The hardware controller 52 generally controls the doors 22 through 28, the blower fan 32 and the control element 45 to regulate the temperature, humidity, and flow of air in the HVAC system 20. The doors 22–28 may also present signals to the controller 50 that indicate the door positions.

Referring to FIG. 3, a drawing illustrating the controller 50 is shown. The controller 50 generally comprises a processor (or micro-controller) 62, at least one rule set 64, at least one adaptive strategy 66, at least one menu 68, a flag 70, at least one counter 72, and at least one timer 74. The processor 62 generally controls the system 20 via the strategies (or routines) 66 according to the rule sets 64. In one example, the processor 62 is implemented having a fuzzy logic inference engine. However, the processor 62 may be implemented having any appropriate control logic to meet the design criteria of a particular application.

The at least one rule set 64 generally corresponds to various control operations (e.g., blower speed, offset, target set point, mode shift, recirculation/fresh ratio, term calibrations, clutch cycling rate or expansion valve position, fog probability, anti-fog action, recirculation/fresh absolute values, standard effective temperature (SET, i.e., an index or scale for measuring thermal comfort), etc. The at least one rule set 64 generally provides the processor 62 with the respective operational details of the strategy 66 to be performed. The rule set 64 basis of the system 20 implemented via the controller 50 generally organizes the at least one strategy 66 in a manner that allows easy calibration and adjustment of the system 20 operation. The specific factors and values of the rule sets 64 are generally developed (or calibrated) to correspond to a specific vehicle implementation.

The system 20 may implement the adaptive strategies 66 alone (i.e., singularly) or in combination. When more than one strategy 66 is implemented, the strategies are generally implemented via compatible (or overlapping) steps. The at least one strategy 66 is generally imperceptible to the user (i.e., the user is generally unaware that at least one preference may be adapted in response to the user input).

The at least one climate control strategy 66 generally implements at least one adaptive dimension (e.g., factor, parameter, etc.) that may be related to or derived from at least one of user thermal comfort preference, air flow comfort preference, mode shift points, air quality sensor 42g output, and learning rate. When adapting, the at least one climate control strategy 66 is generally altered (e.g., adjusted, changed, modified, etc.) along an adaptive dimension according to a learning rate which determines how quickly the strategy changes along the adaptive dimension. The alteration (or adaptation) may be local or global with respect to dependence on another climate control dimension.

A local adaptive alteration generally changes the respective strategy only in an immediate region of the current value of the respective other dimension. In one example, a local alteration may be a change in the parameters of a lookup table (not shown) that relates the adapted dimension to another climate control dimension.

A global adaptive alteration generally changes the respective strategy beyond the immediate region of the current value of the respective other dimension as well as locally. In one example, a global alteration may be a change of an offset in an adaptive dimension relative to dependence on another dimension. In another example, a global alteration may be a change of a slope whereby an adaptive dimension depends on a change in such other dimension. The local and global adaptive alterations of the strategy 66 are generally implemented in software. However, adaptive alterations may be also implemented via any appropriate apparatus or circuitry to meet the design criteria of a particular application.

The thermal comfort preference adaptive dimensions (or factors) generally comprise global offset, global ambient slope, local target temperature offset, global sun load slope, global humidity slope, and global humidity offset. The global offset is generally configured to accommodate global differences in individual thermal perception due to metabolic rate, body size, modesty, short-term acclimation (e.g., a person from a southern climate visiting a northern region), etc.

The global ambient slope dimension is generally configured to accommodate longer-term acclimation and to counter ambient preferences. The local target temperature offset dimension is generally configured to accommodate local preferences such as type and amount of clothing worn in response to ambient conditions. The global sun load slope dimension is generally configured to accommodate sun load sensitivity as may be encountered when the user is wearing dark clothing.

The global humidity slope dimension is generally configured to accommodate standard effective temperature (SET) effects. The global humidity offset dimension is generally configured to accommodate humidity sensitivity effects (e.g., itchy eyes, a person from a high humidity region such as New Orleans, La., U.S.A. in a dry region such as the Mojave Dessert, Calif., U.S.A., etc.).

The airflow comfort preference adaptive dimensions (or factors) generally comprise local minimum blower fan speed, local maximum blower fan speed, local valley widening, and global "radio on" offset. The local minimum blower fan speed dimension is generally configured to raise or lower the blower fan 32 speed valley floor (or lowest fan speed) subject to a minimum blower voltage limitation, if any.

The local maximum blower fan speed dimension is generally configured to raise or lower the blower fan 32 speed valley knee (or transition point) while maintaining similar initial and final blower speeds. The local widen valley dimension may be configured to widen the blower fan speed valley while maintaining the slope that corresponds to the speed transition. Maintaining the slope of the speed transition may reduce or eliminate fan speed control issues and oscillation tendencies. The global "radio on" offset dimension is generally configured to lower the fan speed valley whenever the radio is turned on.

The mode shift point preference adaptive dimensions (or factors) generally comprise at least one local shift point that corresponds to panel venting, at least one local shift point that corresponds to floor venting, at least one local shift point that corresponds to panel/floor venting, and at least one global shift point that corresponds to defrost venting. The local panel shift point and the local panel floor shift point dimensions are generally configured to extend the at least one shift point to direct more (or, alternatively, less) air to the user face.

The local floor shift point dimension is generally configured to extend the at least one shift point to direct more (or, alternatively, less) air to the user feet. The global defrost shift point dimension is generally configured to accommodate fogging concerns.

The air quality sensor 42g output sensitivity adaptive dimensions (or factors) generally comprise modification of at least one threshold that is related to recirculation or modification of at least one threshold that is related to fresh air ventilation. The air quality sensor 42g output adaptive dimensions are generally configured to accommodate variable door 22–28 implementations of the system 20.

The recirculation adaptive dimensions may be configured to lower the threshold for recirculation in response to the air quality sensor 42g output signal. The recirculation adaptive dimensions are generally implemented in the system 20 when the air quality sensor 42g output signal is continuously processed via the controller 50. The threshold for recirculation may be lowered even when the system 20 transition to a recirculation mode is overridden by a probability that cabin glass may fog on an interior surface. The fresh air adaptive dimensions may be configured to raise the threshold for recirculation in response to the air quality sensor 42g output signal.

At least one of the strategies 66 (e.g., strategies 100a and 100b) generally comprises a minor set point adjustment routine. The minor adjustment routine (or climate control adjustment strategy) 100 is generally implemented in connection with a single hit (e.g., push, actuation, tap, twist, etc.) of one of the switches (or keys) 44 and the single increment of respective signal.

When a single key 44 is hit (or a knob is twisted a single increment, a slide control is displaced a single increment, etc.) once during a predetermined time interval (e.g., T_A), the system 20 generally changes to the selected setting (i.e., the system 20 generally performs an adjustment strategy). However, the system 20 generally does not adapt or change a thermal comfort preference adaptive strategy 200, 300, 400, etc. The adjustment strategy 100 is generally independent of the adaptive strategies.

When the system 20 is reset or restarted (e.g., after the user turns the vehicle where the system 20 is implemented off and back on), the system 20 generally activates the appropriate unchanged strategy 66 in response to the vehicle conditions as determined by the sensors 42 and the switches 44. The adaptive dimensions within the adaptive strategies (e.g., strategies 200, 300, etc.) may be explicitly changed by the user with execution of a series of preference adjustments, usually via the menu structure 68. A system 20 adaptive strategy reset may also be implemented via a designated (or predetermined) sequence of switch 44 actuations to return the system 20 to the original adaptive strategy.

When the respective climate control operation is adjusted by an amount that is less than a displayed incremental change, the adjustment strategy 100a is generally implemented and the respective value displayed on the display 46 remains unchanged. However, when the respective climate control operation is adjusted by an amount that corresponds to a displayed incremental change, the adjustment strategy 100b is generally implemented and the respective value displayed on the display 46 is updated.

The menu 68 generally provides the user an explicit selection structure of desired climate control settings. In one example, a "summer" menu selection may be configured having a discharge temperature 42h setting of 65 degrees F and a low blower 32 speed setting. In another example, a "winter" setting may be implemented having a discharge temperature 42h setting of 80 degrees F and a medium to high blower 32 speed setting. In yet another example, the menu 68 may provide for user oriented menu 68 choices such as a "key 1 user" (e.g., a primary driver) preference setting and a "key 2 user" (e.g., a secondary driver) preference setting. The key 1 and key 2 menu 68 preferences may correspond to respective remote entry control devices (not shown). However, the menus 68 may be implemented having any appropriate structure to meet the design criteria of a particular application.

The flag 70 is generally configured to indicate the operation (or actuation) of a key (or interface) 44. The counter 72 is generally implemented to store a value (or number) that corresponds to the level (or amount) of climate control parameter change (or adjustment) that is performed by the user during at least one predetermined time interval.

The time interval T_A is generally a predetermined interval that is timed via at least one timer 74 (e.g., a timer 74a). In one example, the time interval (or period) T_A may be implemented as approximately 2 seconds (e.g., 1.9 sec to 2.1 sec). The interval T_A is preferably implemented in a range of 1.5 sec to 2.4 sec and more preferably in a range of 1.7 sec to 2.2 sec. However, the interval T_A may be implemented as any appropriate relatively short interval when compared to at least one other time interval (or period) that may be timed via controller 50 timers 74b–74n to meet the design criteria of a particular application.

The system 20 is generally configured to respond to a final setting, level, or value determined by actuation of a switch (or key) 44 within the time T_A. Thus, when a user performs a number of adjustments (e.g., up then down, down then up, etc.) during the interval T_A, the controller 50 generally performs the adjustment and strategy 66 adaptation based on the final setting of the respective switch 44.

Figure 4:
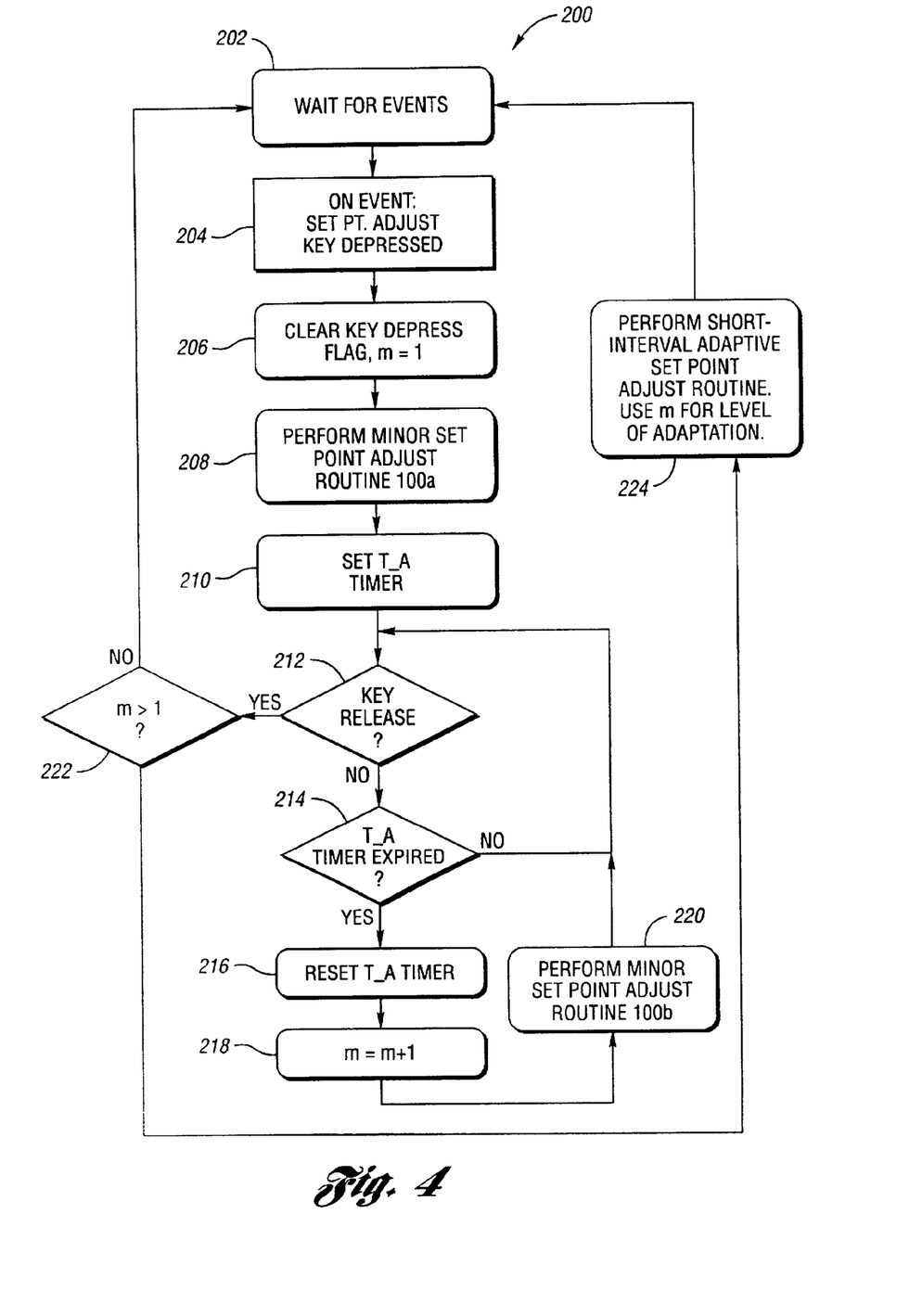
FIG. 4 is a flow diagram of an operation according to the present invention.

Referring to FIG. 4, a flow diagram illustrating a two-second key hold convention (i.e., strategy, operation, method, routine, process, procedure, steps, etc.) 200 according to the present invention is shown. The method (or climate control adaptive set point strategy) 200 is generally implemented as at least one of the strategies 66 in connection with the vehicle climate control system 20. However, the method 200 of the present invention may be implemented in connection with any appropriate climate control system to meet the design criteria of a particular application.

At step 202 the method 200 may wait for climate control related events (e.g., step 204 where the user performs an actuation of a temperature, blower motor speed, etc. interface control such as the switches 44a–44n). On the happening of at least one of the events, at step 206 the process 200 may acknowledge the event (e.g., clear the field flag 70) and set a value m in the counter 72 to 1 (i.e., m=1). The value m generally corresponds to the level of adaptation that may be implemented when a strategy adjusts a set point routine. The value m=1 generally corresponds to a predetermined level of a signal assertion or key actuation that relates to a single hit, click, increment, etc., of a switch or key 44. The value m>1 generally corresponds to a level of a signal assertion or key actuation that relates to multiple or extended hits, clicks, increments, etc., of a switch or key 44.

The process 200 may perform the minor set point adjustment routine 100a at step 208. At step 210, the process 200 may start a timer 74 that corresponds to the time interval T_A (e.g., the timer 74a).

At decision step 212, the method 200 may determine whether or not the respective key 44 has been released (i.e., whether or not key actuation is continuing). When the key 44 is not released, the method 200 may determine whether or not the timer 74a has expired (i.e., the time interval T_A has been exceeded) at decision step 214.

When the timer 74a has expired, the method 200 may reset the timer 74a at step 216. The method 200 may increment the counter 72 by 1 (i.e., m=m+1) at step 218. The process 200 may perform the minor set point adjustment routine 100b at step 220. The method 200 may return to the decision step 212. Returning to the decision step 214, when the time interval T_A has not been exceeded, the method 200 generally returns to the step 212. When the decision step 212 determines that the key 44 has been released, the method 200 may determine whether or not the value of m is greater than 1 at decision step 222.

When the decision step 222 determines that the value of m that is stored in the counter 72 is greater than 1, the method 200 may perform a short-interval adaptive set point adjust routine implementing m as the level of adaptation at step 224. The method 200 then generally returns to the step 202 and waits for the next event. When the decision step 222 determines that the value of m is less than or equal to 1, the method 200 then generally returns to the step 202 and waits for the next event. The short-interval adaptive set point adjust routine implemented via the process 200 at step 224 generally implements at least one of the rule sets 64.

Figure 5:
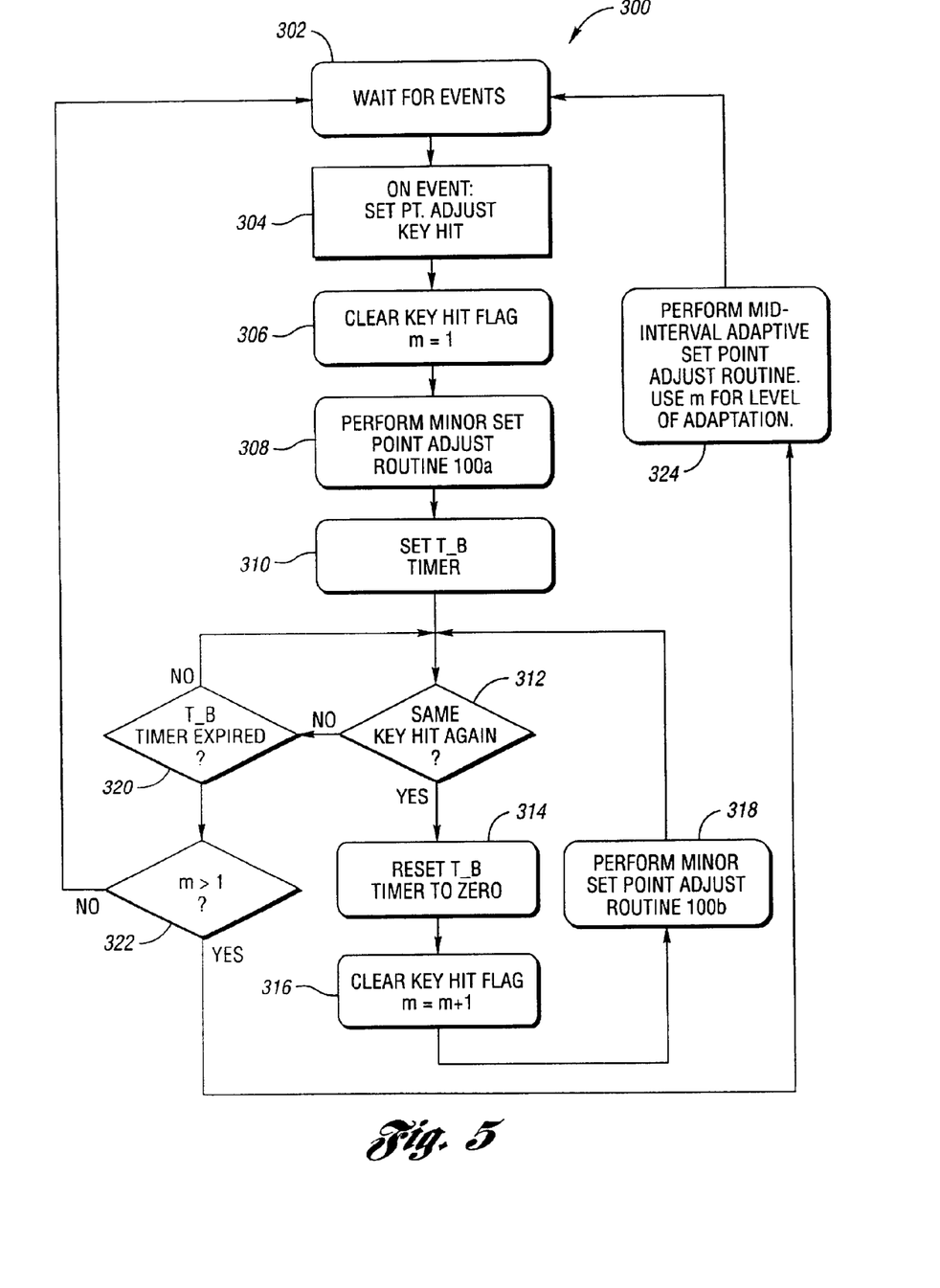
FIG. 5 is a flow diagram of an alternative operation according to the present invention.

Referring to FIG. 5, a flow diagram illustrating a two-plus key hit (e.g., intermediate level adaptive) convention 300 according to the present invention is shown. The method (or climate control adaptive set point strategy) 300 is generally implemented as at least one of the strategies 66 in connection with the vehicle climate control system 20. However, the method 300 of the present invention may be implemented in connection with any appropriate climate control system to meet the design criteria of a particular application.

At step 302 the method 300 may wait for climate control related events (e.g., step 304 where the user performs an actuation of a temperature, blower motor speed, etc. interface control such as the switches 44a–44n). On the happening of at least one of the events, at step 306 the process 300 may acknowledge the event (e.g., clear the field FLAG 70) and set a value m in the counter 72 to 1 (i.e., m=1).

The process 300 may perform the minor set point adjustment routine 100a at step 308. At step 310 the process 300 may start a timer 74b. The timer 74b generally corresponds to a time interval T_B. In one example, the interval T_B may be similar to the interval T_A. However, the interval T_B may be implemented as any appropriate time interval to meet the design criteria of a particular application.

At decision step 312 the method 300 may determine whether or not the respective key 44 has been actuated (i.e., hit, pushed, tapped, twisted, slid, etc.) again. When the key 44 is actuated a successive time, the method 300 may reset the timer 74b to 0 seconds at step 314.

The method 300 may clear the key hit flag 70 and increment the counter 72 by 1 (i.e., m=m+1) at step 316. The process 300 may perform the minor set point adjustment routine 100b at step 388. The method 300 may then return to the step 312.

When the key 44 has not been actuated again, the method 300 generally determines whether or not the timer 74b has expired at step 320. When the step 320 determines that the timer 74b has expired, the method 300 may determine whether or not the value of m that is stored in the counter 72 is greater than 1 at decision step 322.

When the decision step 322 determines that the value of m is greater than 1, the method 300 may perform a mid-interval adaptive set point adjust routine implementing m as the level of adaptation at step 324. The method 300 then generally returns to the step 302 and waits for the next event. When the decision step 322 determines that the value of m is less than or equal to 1, the method 300 then generally returns to the step 302 and waits for the next event.

Returning to the decision step 320, when the timer 74b has not expired, the process 300 generally returns to the decision step 312. The mid-interval adaptive set point adjust routine implemented via the process 300 at the step 324 generally implements at least one of the rule sets 64.

Figure 6:
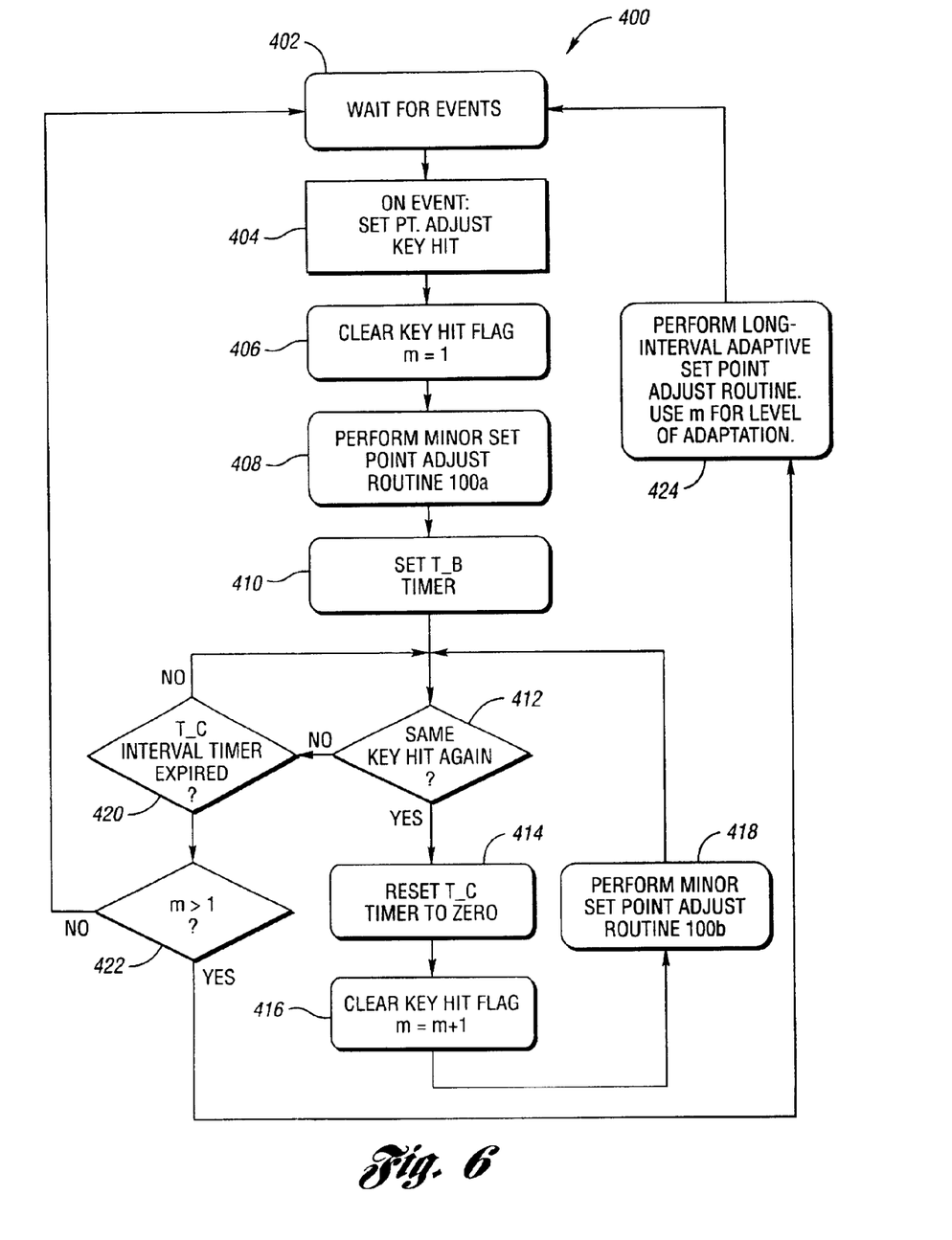
FIG. 6 is a flow diagram of another alternative operation according to the present invention.

Referring to FIG. 6, a flow diagram illustrating a long-interval key hit convention 400 according to the present invention is shown. The method (or climate control adaptive set point strategy) 400 is generally implemented as at least one of the strategies 66 in connection with the vehicle climate control system 20. However, the method 400 of the present invention may be implemented in connection with any appropriate climate control system to meet the design criteria of a particular application.

At step 402 the method 400 may wait for climate control related events (e.g., step 404 where the user performs an actuation of a temperature, blower motor speed, etc. interface control such as the switches 44a–44n). On the happening of at least one of the events, at step 406 the process 400 may acknowledge the event (e.g., clear the field FLAG 70) and set a value m in the counter 72 to 1 (i.e., m=1).

The process 400 may perform the minor set point adjustment routine 100a at step 408. At step 410 the process 400 may start a timer 74 (e.g., timer 74c) that may correspond to a relatively long predetermined time interval (e.g., an interval T_C) when compared to the intervals T_A and T_B.

The time interval T_C is generally timed via at least one timer 74 (e.g., the timer 74c). In one example, the time interval (or period) T_C may be implemented as approximately 10 minutes (e.g., nine minutes to eleven minutes). In another example, the time interval (or period) T_C may be implemented as approximately 5 minutes (e.g., four minutes to six minutes). The predetermined interval T_C is preferably implemented in a range of 1 minute to 20 minutes and, more preferably, in a range of 3 minutes to 12 minutes. However, the interval T_C may be implemented as any appropriate substantially long interval when compared to time intervals (or periods). that are timed via controller 50 timers 74a and 74b to meet the design criteria of a particular application.

At decision step 412 the method 400 may determine whether or not the respective key 44 has been actuated (i.e., hit, pushed, tapped, twisted, slid, etc.) again (i.e., repeatedly). When the key 44 is actuated a successive time, the method 400 may reset the timer 74c to 0 seconds at step 414.

The method 400 may clear the key hit flag 70 and increment the counter 72 by 1 (i.e., m=m+1) at step 416. The process 400 may perform the minor set point adjustment routine 100b at step 418. The method 400 may then return to the step 412.

When the key 44 has not been actuated again, the method 400 generally determines whether or not the timer 74c has expired at step 420. When the step 420 determines that the timer 74c has expired, the method 400 may determine whether or not the value of m is greater than 1 at decision step 422.

When the decision step 422 determines that the value of m that is stored in the counter 72 is greater than 1, the method 400 may perform a long-interval adaptive set point adjust routine implementing m as the level of adaptation at step 424. The method 400 then generally returns to the step 402 and waits for the next event. When the decision step 422 determines that the value of m is less than or equal to 1, the method 400 then generally returns to the step 402 and waits for the next event.

Returning to the decision step 420, when the timer 74c has not expired, the process 400 generally returns to the decision step 412. The long-interval adaptive set point adjust routine implemented via the process 400 at the step 424 generally implements at least one of the rule sets 64.

In another example mode of operation (e.g., another climate control adaptive set point strategy), the system 20 may implement at least one alternative strategy 66 (e.g., alternative adjustment strategy 500). The strategy (or routine, process, steps, etc.) 500 may be configured to implement particular patterns of switch 44 actuations (e.g., a combination of temperature key 44a and fan key 44b hits, a combination of fan key 44b and A/C key 44d hits, etc.) in connection with at least one rule set 64 to adapt a user thermal comfort preference. When any of the strategies 66 is implemented to adapt a user thermal comfort preference, the controller 50 may request user confirmation of the adaptation (e.g., via a message on the display 46).

In vehicles having multi-zone climate control systems, unique, separate (or independent) thermal comfort strategies 66 may be implemented or adapted in response to user preferences for each one of the zones.

The methods 100(a–b), 200, 300, etc., and the system 20 of the present invention generally provide a climate control strategy that adapts to accommodate the individual preference of comfort such that fewer adjustments are performed when similar climate conditions are encountered. The improved climate control strategy may allow users to indicate their preferences, both explicitly and inferentially. The improved climate control strategy of the present invention generally establishes interpretation of user climate control preferences via existing climate control interfaces (e.g., temperature controls 44a, blower motor speed controls 44b, etc.).

While the best mode for carrying out the invention has been described in detail, those familiar with the art to which this invention relates will recognize various alternative designs and embodiments for practicing the invention as defined by the following claims.

What is claimed is:

1. A method for adapting a vehicle climate control system to a user comfort preference, the method comprising:

performing an adjustment strategy in response to assertion of at least one user-generated signal at less than a predetermined level and during less than a predetermined time interval; and performing at least one adaptive strategy in response to assertion of the user-generated signal at greater than the predetermined level during the predetermined time interval.

2. The method of claim 1 wherein the adjustment strategy comprises adjusting a respective climate control output to a level responsive to the user-generated signal.

3. The method of claim 1 wherein the adjustment strategy is independent of the adaptive strategy.

4. The method of claim 1 wherein the adaptive strategy performs the adapting to a level responsive to the user-generated signal.

5. The method of claim 1 further comprising altering the adaptive strategy along an adaptive climate control dimension globally beyond an immediate region of dependence on another climate control dimension.

6. The method of claim 1 further comprising altering the adaptive strategy along an adaptive climate control dimension locally in an immediate region of dependence on another-climate-control dimension.

7. The method of claim 1 wherein the adaptive strategy is performed according to at least one rule set that corresponds to a specific vehicle application.

8. The method of claim 1 further comprising performing a combination of adaptive strategies.

9. The method of claim 1 further comprising performing independent adaptive strategies in each of a plurality of zones within a vehicle.

10. A vehicle climate control system adaptable to a user climate comfort preference comprising:

a plurality of user interfaces; and a controller for performing an adjustment strategy when a user adjusts at least one of the interfaces by less than a predetermined amount and during less than a predetermined time interval and for performing at least one adaptive strategy when the user adjusts the interface by greater than a predetermined amount during the predetermined time.

11. The system of claim 10 wherein the adjustment strategy comprises adjusting a respective climate control output to a level responsive to an amount the user adjusts the interface.

12. The system of claim 10 wherein the adjustment strategy is independent of the adaptive strategy.

13. The system of claim 10 wherein the adaptive strategy performs the adapting to a level responsive to an amount the user adjusts the interface.

14. The system of claim 10 wherein the adaptive strategy is altered along an adaptive climate control dimension globally beyond an immediate region of dependence on another climate control dimension.

15. The system of claim 10 wherein the adaptive strategy is altered along an adaptive climate control dimension locally in an immediate region of dependence on another climate control dimension.

16. The system of claim 10 wherein the adaptive strategy is performed according to at least one rule set that corresponds to a specific vehicle application.

17. The system of claim 10 wherein the system performs a combination of the adaptive strategies.

18. The system of claim 10 wherein the system performs independent adaptive strategies in each of a plurality of zones within a vehicle.

19. For use in a vehicle climate control system, a method for adapting to a user climate comfort preference, the method comprising:

providing a controller for performing an adjustment strategy when a user adjusts at least one interface by less than a predetermined level and during less than a predetermined time interval and for performing at least one adaptive strategy when the user adjusts the interface by greater than the predetermined level during the predetermined interval.

20. The method of claim 19 wherein the adaptive strategy performs the adapting to a level responsive to an amount the user adjusts the interface.

* * * * *